United States Patent
Lee et al.

(10) Patent No.: US 9,582,936 B2
(45) Date of Patent: Feb. 28, 2017

(54) METHOD AND APPARATUS FOR COMBINING PLURALITY OF 2D IMAGES WITH 3D MODEL

(75) Inventors: Bong-heon Lee, Gangwon-do (KR); Jin-yong Lee, Gangwon-do (KR)

(73) Assignee: SAMSUNG MEDISON CO., LTD., Hongcheon-Gun, Gangwon-Do (KR)

(*) Notice: Subject to any disclaimer, the term of this patent is extended or adjusted under 35 U.S.C. 154(b) by 1300 days.

(21) Appl. No.: 13/452,232

(22) Filed: Apr. 20, 2012

(65) Prior Publication Data

US 2013/0135292 A1    May 30, 2013

(30) Foreign Application Priority Data

Nov. 28, 2011    (KR) .................. 10-2011-0125217

(51) Int. Cl.
*G06T 19/00*    (2011.01)

(52) U.S. Cl.
CPC .......... *G06T 19/00* (2013.01); *G06T 2210/41* (2013.01)

(58) Field of Classification Search
CPC ...................................................... G06T 19/00
USPC ........................................................ 345/419
See application file for complete search history.

(56) References Cited

U.S. PATENT DOCUMENTS

| 7,798,966 B2 | 9/2010 | Kawashima et al. |
| 2009/0136109 A1* | 5/2009 | Salgo .................. A61B 8/0858 382/131 |
| 2010/0262388 A1* | 10/2010 | Shin et al. ...................... 702/56 |

FOREIGN PATENT DOCUMENTS

| JP | 2003-061956 A | 3/2003 |
| JP | 2005-160616 A | 6/2005 |
| JP | 2006-149702 A | 6/2006 |
| KR | 10-2011-0060180 A | 6/2011 |

OTHER PUBLICATIONS

Translation of JP 2003061956 to Hashimoto, obtained Feb. 10, 2015.*
Korean Notice of Allowance, w/ English translation thereof, issued in Korean Patent Application No. KR 10-2011-0125217 dated Jun. 25, 2013.
Korean Office Action, w/ English translation thereof, issued in Korean Patent Application No. KR 10-2011-0125217 dated Dec. 20, 2012.

* cited by examiner

*Primary Examiner* — Maurice L McDowell, Jr.
(74) *Attorney, Agent, or Firm* — McDermott Will & Emery LLP

(57) ABSTRACT

A method and apparatus for combining a three-dimensional (3D) model with a plurality of two-dimensional (2D) images by adjusting degrees of transparency of the plurality of 2D images. The method includes: obtaining a plurality of 2D images; arranging the plurality of 2D images in a 3D space based on predetermined criteria; obtaining spatial coordinates of each of the plurality of 2D images arranged in the 3D space; generating a 3D model of the plurality of 2D images arranged in the 3D space based on the spatial coordinates; changing attribute information of the plurality of 2D images arranged in the 3D space; and displaying the 3D model and the plurality of 2D images whose attribute information is changed.

11 Claims, 3 Drawing Sheets

METHOD AND APPARATUS FOR COMBINING PLURALITY OF 2D IMAGES WITH 3D MODEL

CROSS-REFERENCE TO RELATED PATENT APPLICATION

This application claims the benefit of Korean Patent Application No. 10-2011-0125217, filed on Nov. 28, 2011, in the Korean Intellectual Property Office, the disclosure of which is incorporated herein in its entirety by reference.

BACKGROUND OF THE INVENTION

1. Field of the Invention

The present invention relates to a method and apparatus for combining two-dimensional (2D) images with a three-dimensional (3D) model, and more particularly, to a method and apparatus for displaying a plurality of 2D images and a 3D model by adjusting degrees of transparency of the 2D images.

2. Description of the Related Art

Ultrasound diagnostic devices transmit an ultrasound signal to a predetermined portion in the interior of a subject's body from a surface of the subject's body and obtain an image of blood flow or a cross-section of a soft tissue by using information of the ultrasound signal reflected from the predetermined portion.

Ultrasound diagnostic devices have advantages in that they have a small design and low costs and may display images in real time. Also, since ultrasound diagnostic devices have high safety because they have no risk of X-ray radiation, ultrasound diagnostic devices are widely used along with other image diagnostic devices such as X-ray diagnostic devices, computerized tomography (CT) scanners, magnetic resonance imaging devices, and nuclear medicine diagnostic devices.

If ultrasound diagnostic devices may generate a three-dimensional (3D) model by using a plurality of two-dimensional (2D) images and display both the 3D model and the 2D images, a structure, an operation, and so on of a subject may be able to be easily determined.

SUMMARY OF THE INVENTION

According to an aspect of the present invention, there is provided a method of combining a plurality of two-dimensional (2D) images with a three-dimensional (3D) model, the method including: obtaining a plurality of 2D images; arranging the plurality of 2D images in a 3D space based on predetermined criteria; obtaining spatial coordinates of each of the plurality of 2D images arranged in the 3D space; generating a 3D model of the plurality of 2D images arranged in the 3D space based on the spatial coordinates; changing attribute information of the plurality of 2D images arranged in the 3D space; and displaying the 3D model and the plurality of 2D images whose attribute information is changed.

According to another aspect of the present invention, there is provided an apparatus for combining a plurality of two-dimensional (2D) images with a three-dimensional (3D) model, the apparatus including: a 2D image obtaining unit that obtains a plurality of 2D images; an image arranging unit that arranges the plurality of 2D images in a 3D space based on predetermined criteria; a spatial coordinate obtaining unit that obtains spatial coordinates of each of the plurality of 2D images arranged in the 3D space; a 3D model generating unit that generates a 3D model of the plurality of 2D images arranged in the 3D space based on the spatial coordinates; an image attribute changing unit that changes attribute information of the plurality of 2D images arranged in the 3D space; and a display unit that displays the 3D model and the plurality of 2D images whose attribute information is changed.

According to another aspect of the present invention, there is provided a computer-readable recording medium having embodied thereon a program for executing the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
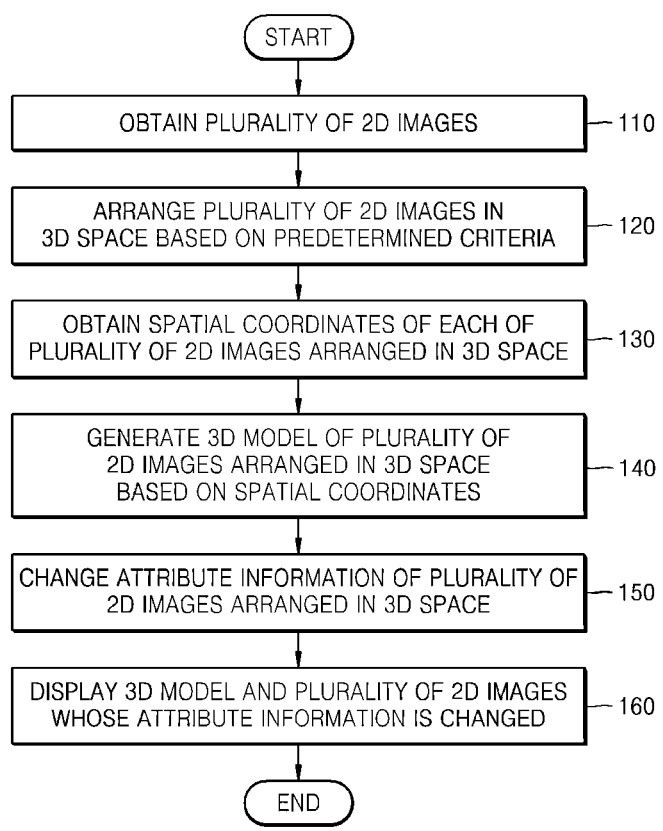
FIG. 1 is a flowchart illustrating a method of combining a plurality of two-dimensional (2D) images with a three-dimensional (3D) model, according to an embodiment of the present invention.

The present invention will now be described more fully with reference to the accompanying drawings, in which exemplary embodiments of the invention are shown.

Terms used hereinafter are used considering the functions in the present invention and may be changed according to a user's or operator's intention, usual practice, or development of new technology. Also, some terms may be arbitrarily selected by the applicant, and in this case, the meaning of the terms will be explained in detail. Accordingly, the terms will be defined based on the entire content of the description of the present invention.

Unless otherwise noted, the term "comprise" or variations such as "comprises" or "comprising" is understood to mean "includes, but is not limited to" so that other elements that are not explicitly mentioned may also be included. Also, the term "unit" or "module" means a unit of performing at least one function and may operate by using hardware or software or a combination of hardware and software.

The term "ultrasound image" herein means an image of a subject obtained by using ultrasound. The subject may be a body part. For example, examples of the subject may include an organ such as a liver, a heart, a womb, a brain, a breast, or an abdomen, or an embryo.

The term "user" herein is, but is not limited to, a medical expert such as a surgeon, a nurse, a clinical pathologist, or a medical image expert.

Hereinafter, the present invention will be described more fully with reference to the accompanying drawings, in which exemplary embodiments of the invention are shown. The invention may, however, be embodied in many different forms and should not be construed as being limited to the embodiments set forth herein. When publicly known techniques or structures related to the present invention may unnecessarily make the present invention unclear, the detailed description will be omitted. Similar elements are denoted by similar reference numerals throughout.

Figure 2:
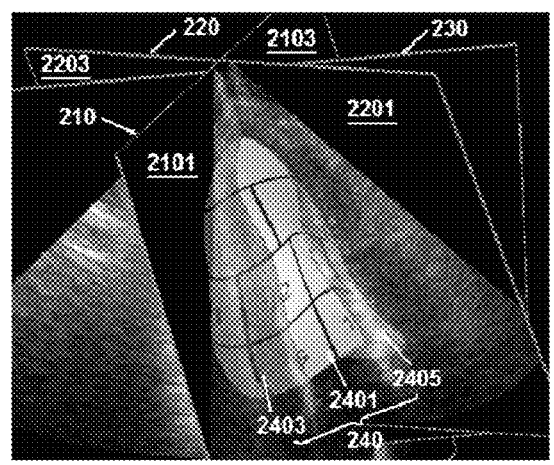
FIG. 2 is an image illustrating a case where a plurality of 2D images are arranged in a 3D space based on predetermined criteria and a 3D model is generated.

FIG. 1 is a flowchart illustrating a method of combining a plurality of two-dimensional (2D) images with a three-dimensional (3D) model, according to an embodiment of the present invention. FIG. 2 is an image illustrating a case where a plurality of 2D images 210, 220, and 230 are arranged in a 3D space based on predetermined criteria and a 3D model 240 is generated.

A method of combining the plurality of 2D images 210, 220, and 230 with the 3D model 240 may include operation 110 in which the plurality of 2D images 210, 220, and 230, operation 120 in which the plurality of 2D images 210, 220, and 230 are arranged in a 3D space based on predetermined criteria, operation 130 in which spatial coordinates of each of the plurality of 2D images 210, 220, and 230 arranged in the 3D space are obtained, and operation 140 in which the 3D model 240 of the plurality of 2D images 210, 220, and 230 arranged in the 3D space is generated. Also, the method may include operation 150 in which attribute information of the plurality of 2D images 210, 220, and 230 arranged in the 3D space is changed and operation 160 in which the 3D model 240 and the plurality of 2D images 210, 220, and 230 whose attribute information is changed are displayed.

Operation 110 in which the plurality of 2D images 210, 220, and 230 are obtained may include an operation of obtaining the plurality of 2D images 210, 220, and 230 by photographing a subject at various angles by using ultrasound. The plurality of 2D images 210, 220, and 230 may be two or more 2D images. Preferably, the plurality of 2D images 210, 220, and 230 may include at least three 2D images.

For example, if the subject is a heart, the plurality of 2D images 210, 220, and 230 may include a first image obtained by photographing a left atrium and a left ventricle, a second image obtained by photographing the left ventricle, the left atrium, and a right atrium, and a third image obtained by photographing the left ventricle, the left atrium, a right ventricle, and the right atrium.

Operation 120 in which the plurality of 2D images 210, 220, and 230 are arranged in the 3D space based on predetermined criteria may include an operation of arranging the plurality of 2D images 210, 220, and 230 in the 3D space such that the plurality of 2D images 210, 220, and 230 overlap with one another at a preset angle, which will be explained in detail with reference to FIG. 2. For example, if a heart is photographed as a subject to obtain a plurality of 2D images, the plurality of 2D images may be arranged in a 3D space by using an apex of the subject (i.e., the heart) as a predetermined reference point. Preferably, the plurality of 2D images may be arranged to overlap with one another at 60° based on the apex of the subject.

Operation 130 in which the spatial coordinates of each of the plurality of 2D images 210, 220, and 230 arranged in the 3D space are obtained may include an operation of obtaining coordinates of the subject in the plurality of 2D images 210, 220, and 230 in x, y, and z-axes in the 3D space.

Operation 140 in which the 3D model 240 of the plurality of 2D images 210, 220, and 230 arranged in the 3D space is generated based on the spatial coordinates may include an operation of generating straight lines based on the spatial coordinates and curved lines and surfaces by using the straight lines. The 3D model 240 may be naturally or elaborately generated by adjusting the number of the plurality of 2D images 210, 220, and 230. Also, operation 140 in which the 3D model 240 of the plurality of 2D images 210, 220, and 230 arranged in the 3D space is generated based on the spatial coordinates may further include an operation of obtaining motion information of the subject based on a motion of the subject. For example, if the subject is a heart, the spatial coordinates may change as the heart beats, and information about motions of an inner wall and an outer wall of the heart, a velocity at which the heart beats, and so on as the spatial coordinates change may be obtained. The motion information may include at least one parametric value, and the at least one parametric value may indicate information about at least one of a strain rate, a motion velocity, and a volumetric change of the subject.

Figure 3:
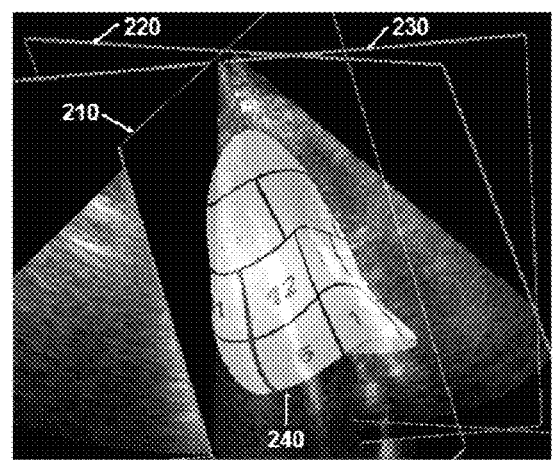
FIG. 3 is an image illustrating a result obtained after combining the 3D model with the plurality of 2D images.

Also, the method may include operation 150 in which the attribute information of the plurality of 2D images 210, 220, and 230 arranged in the 3D space is changed. The attribute information may include information about degrees of transparency of the plurality of 2D images 210, 220, and 230. In the present embodiment, operation 150 in which the attribute information of the plurality of 2D images 210, 220, and 230 arranged in the 3D space is changed may further include an operation of adjusting an extent to which the 3D model 240 and the plurality of 2D images 210, 220, and 230 overlap with each other by adjusting the degrees of transparency of the plurality of 2D images 210, 220, and 230. For example, both the 3D model 240 and the plurality of 2D images 210, 220, and 230 may be displayed by adjusting the degrees of transparency of the plurality of 2D images 210, 220, and 230 as shown in FIG. 3. In the present embodiment, portions 2403 and 2405 of the 3D model 240 corresponding to portions 2101 and 2201 which are covered when the plurality of 2D images 210, 220, and 230 are arranged to overlap with one another may also be displayed by adjusting the degrees of transparency of the plurality of 2D images 210, 220, and 230 without changing an angle of a screen which is currently viewed. In the present embodiment, both the portions 2403 and 2405 of the 3D model 240 which are covered by the portions 2101 and 2201 of the plurality of 2D images 210, 220, and 230 and a portion 2401 of the 3D model 240 which is currently displayed may be displayed. In other words, the degrees of transparency of the plurality of 2D images 210, 220, and 230 may be adjusted to display both the plurality of 2D images 210, 220, and 230 and the portions 2401, 2403, and 2405 of the 3D model 240.

Furthermore, operation 150 in which the attribute information of the plurality of 2D images 210, 220, and 230 arranged in the 3D space is changed may include an operation of changing the attribute information of the plurality of 2D images 210, 220, and 230 automatically to a preset value or according to a user's input.

Also, the method may include operation 160 in which the 3D model 240 and the plurality of 2D images 210, 220, and 230 whose attribute information is changed are displayed. The 3D model 240 and the plurality of 2D images 210, 220, and 230 may be displayed by adjusting the degrees of transparency of the plurality of 2D images 210, 220, and 230 as described above.

Also, operation 160 in which the 3D model 240 and the plurality of 2D images 210, 220, and 230 whose attribute information is changed are displayed may further include an operation of mapping information of the subject corresponding to the at least one parametric value in a predetermined form to the 3D model 240 to obtain a resultant structure and displaying the resultant structure. Examples of the predetermined form may include an index using at least one of text and color. For example, the subject may be divided into a plurality of sections as shown in FIG. 3. Each of the sections may be expressed in the form of an index using at least one of text and color. For example, if the subject is a heart, a motion degree of the heart or a strain rate of an outer wall of the heart may be expressed in the form of an index using text such as a positive integer. That is, a motion degree or a strain rate may be expressed by using a number. Also, information about a motion of the subject may be expressed in various colors.

FIG. 3 is an image illustrating a result obtained after combining the plurality of 2D images 210, 220, and 230 with the 3D model 240. The 3D model 240 of the subject may be displayed along with the plurality of 2D images 210, 220, and 230 by adjusting the degrees of transparency of the plurality of 2D images 210, 220, and 230 as described above.

Figure 4:
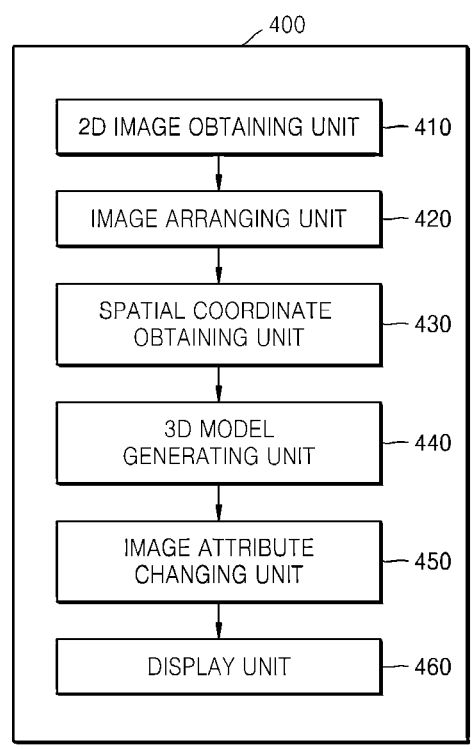
FIG. 4 is a block diagram illustrating an apparatus for combining the plurality of 2D images with the 3D model, according to an embodiment of the present invention.

FIG. 4 is a block diagram illustrating an apparatus for combining the plurality of 2D images 210, 220, and 230 with the 3D model 240, according to an embodiment of the present invention.

The apparatus may include a 2D image obtaining unit 410 that obtains the plurality of 2D images 210, 220, and 230, an image arranging unit 420 that arranges the plurality of 2D images 210, 220, and 230 in a 3D space based on predetermined criteria, and a spatial coordinate obtaining unit 430 that obtains spatial coordinates of each of the plurality of 2D images 210, 220, and 230 arranged in the 3D space. Also, the apparatus may include a 3D model generating unit 440 that generates the 3D model 240 of the plurality of 2D images 210, 220, and 230 arranged in the 3D space based on the spatial coordinates, an image attribute changing unit 450 that changes attribute information of the plurality of 2D images 210, 220, and 230 arranged in the 3D space, and a display unit 460 that displays the 3D model 240 and the plurality of 2D images 210, 220, and 230 whose attribute information is changed.

The 2D image obtaining unit 410 may obtain the plurality of 2D images 210, 220, and 230 by photographing a subject at various angles by using ultrasound. The plurality of 2D images 210, 220, and 230 may be two or more 2D images. Preferably, the plurality of 2D images 210, 220, and 230 may include at least three 2D images.

For example, if the subject is a heart, the plurality of 2D images 210, 220, and 230 may include a first image obtained by photographing a left atrium and a left ventricle, a second image obtained by photographing the left ventricle, the left atrium, and a right atrium, and a second image obtained by photographing the left ventricle, the left atrium, a right ventricle, and the right atrium.

The image arranging unit 420 may arrange the plurality of 2D images 210, 220, and 230 in the 3D space such that the plurality of 2D images 210, 220, and 230 overlap with one another at a preset angle as described above with reference to FIG. 2. For example, if a heart is photographed as a subject to obtain a plurality of 2D images, the plurality of 2D images may be arranged in a 3D space by using an apex of the subject (i.e., the heart) as a predetermined reference point. Preferably, the plurality of 2D images may be arranged to overlap with one another at 60° based on the apex of the subject.

The spatial coordinate obtaining unit 430 may obtain coordinates of the subject in the plurality of 2D images 210, 220, and 230 in x, y, and z-axes in the 3D space.

The 3D model generating unit 440 may generate straight lines based on the spatial coordinates and generate curved lines and surfaces using the straight lines. The 3D model 240 may be naturally or elaborately generated by adjusting the number of the plurality of 2D images 210, 220, and 230.

Also, the 3D model generating unit 440 may further obtain motion information of the subject based on a motion of the subject. For example, if the subject is a heart, the spatial coordinates may change as the heart beats, and information about motions of an inner wall and an outer wall of the heart, a velocity at which the heart beats, and so on as the spatial coordinates change may be obtained. The motion information may include at least one parametric value, and the at least one parametric value may indicate information about at least one of a strain rate, a motion velocity, and a volumetric change of the subject.

Also, the apparatus may include the image attribute changing unit 450 that changes the attribute information of the plurality of 2D images 210, 220, and 230 arranged in the 3D space. The attribute information may include information about degrees of transparency of the plurality of 2D images 210, 220, and 230. In FIG. 4, the image attribute changing unit 450 may further adjust an extent to which the 3D model 240 and the plurality of 2D images 210, 220, and 230 overlap with each other by adjusting the degrees of transparency of the plurality of 2D images 210, 220, and 230. For example, the image attribute changing unit 450 may display both the 3D model 240 and the plurality of 2D images 210, 220, and 230 by adjusting the degrees of transparency of the plurality of 2D images 210, 220, and 230. In FIG. 4, the portions 2403 and 2405 of the 3D model 240 corresponding to the portions 2101 and 2201 which are covered when the plurality of 2D images 210, 220, and 230 are arranged may also be displayed by adjusting the degrees of transparency of the plurality of 2D images 210, 220, and 230 without changing an angle of a screen which is currently viewed. In FIG. 4, both the portions 2403 and 2405 of the 3D model 240 which are covered by the portions 2101 and 2201 of the plurality of 2D images 210, 220, and 230 and the portion 2401 of the 3D model 240 which is currently displayed may be displayed by adjusting the degrees of transparency of the portions 2101 and 2201 of the plurality of 2D images 210, 220, and 230. In other words, the degrees of transparency of the plurality of 2D images 210, 220, and 230 may be adjusted to display both the plurality of 2D images 210, 220, and 230 and the portions 2401, 2403, and 2405 of the 3D model 240.

Furthermore, the attribute information of the plurality of 2D images 210, 220, and 230 arranged in the 3D space may be changed automatically to a preset value or according to a user's input.

Also, the apparatus may include the display unit 460 that displays the 3D model 240 and the plurality of 2D images 210, 220, and 230 whose attribute information is changed. The 3D model 240 and the plurality of 2D images 210, 220, and 230 may be displayed by adjusting the degrees of transparency of the plurality of 2D images 210, 220, and 230 as described above.

Also, the display unit 460 may further map information of the subject corresponding to the at least one parametric value in a predetermined form to the 3D model 240 to obtain a resultant structure and display the resultant structure. Examples of the predetermined form may include an index using at least one of text and color. For example, the subject may be divided into a plurality of sections as shown in FIG. 3. Each of the sections may be expressed in the form of an index using at least one of text and color. For example, if the subject is a heart, a motion degree of the heart or a strain rate of an outer wall of the heart may be expressed in the form of an index using text such as a positive integer. That is, a motion degree or a strain rate may be expressed by using a number. Also, information about a motion of the subject may be expressed in various colors.

The one or more embodiments of the present invention may be implemented as an executable program, and may be executed by a general-purpose digital computer that runs the program by using a computer-readable recording medium.

Examples of the computer-readable medium include storage media such as magnetic storage media (e.g., read only memories (ROMs), floppy discs, or hard discs), and optically readable media (e.g., compact disk-read only memories (CD-ROMs), or digital versatile disks (DVDs)).

While the present invention has been particularly shown and described with reference to exemplary embodiments thereof using specific terms, the embodiments and terms have been used to explain the present invention and should not be construed as limiting the scope of the present invention defined by the claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of combining a plurality of two-dimensional (2D) images with a three-dimensional (3D) model, the method comprising:
    obtaining a plurality of 2D images;
    arranging the plurality of 2D images in a 3D space, wherein the plurality of 2D images intersect in a predetermined point;
    obtaining spatial coordinates of each of the plurality of 2D images arranged in the 3D space;
    generating a 3D model of the plurality of 2D images arranged in the 3D space based on the spatial coordinates;
    adjusting an extent to which the 3D model and the plurality of 2D images overlap with each other by adjusting the degrees of transparency of the plurality of 2D) images; and
    displaying the 3D model and the plurality of 2D images such that the plurality of 2D images overlap with one another whose information about degrees of transparency is adjusted.

2. The method of claim 1, wherein the arranging the plurality of 2D images in a 3D space comprises arranging the plurality of 2D images to overlap with one another at a preset angle.

3. The method of claim 1, wherein the generating of the 3D model of the plurality of 2D images arranged in the 3D space based on the spatial coordinates comprises obtaining motion information of a subject based on a motion of the subject.

4. The method of claim 3, wherein the motion information comprises at least one parametric value, and the at least one parametric value indicates at least one of a strain rate, a motion velocity, and a volumetric change of the subject.

5. The method of claim 4, wherein the displaying of the 3D model and the plurality of 2D images comprises mapping information of the subject corresponding to the at least one parametric value in a predetermined form to the 3D model to obtain a resultant structure and displaying the resultant structure,
    wherein the predetermined form comprises an index using at least one of text and color.

6. A non-transitory computer-readable recording medium having embodied thereon a program for executing the method of any one of claims 1 through 4 and 5.

7. An apparatus for combining a plurality of two-dimensional (2D) images with a three-dimensional (3D) model, the apparatus comprising:
    a processor configured to:
        obtain a plurality of 2D images;
        arrange the plurality of 2D images in a 3D space, wherein the plurality of 2D images intersect in a predetermined point;
        obtain spatial coordinates of each of the plurality of 2D images arranged in the 3D space;
        generate a 3D model of the plurality of 2D images arranged in the 3D space based on the spatial coordinates;
        adjust an extent to which the 3D model and the plurality of 2D images overlap with each other by adjusting the degrees of transparency of the plurality of 2D images; and
    display the 3D model and the plurality of 2D images such that the plurality of 2D images overlap with one another whose information about degrees of transparency is adjusted.

8. The apparatus of claim 7, wherein the processor is configured to arrange the plurality of 2D images to overlap with one another at a preset angle.

9. The apparatus of claim 7, wherein the processor is further configured to obtain motion information of a subject based on a motion of the subject.

10. The apparatus of claim 9, wherein the motion information comprises at least one parametric value, and the at least one parametric value indicates at least one of a strain rate, a motion velocity, and a volumetric change of the subject.

11. The apparatus of claim 10, wherein the display further maps information about the subject corresponding to the at least one parametric value in a predetermined form to the 3D model to obtain a resultant structure and displays the resultant structure,
    wherein the predetermined form comprises an index using at least one of text and color.

* * * * *